(12) United States Patent
Bollapalli et al.

(10) Patent No.: US 9,100,134 B2
(45) Date of Patent: Aug. 4, 2015

(54) SYNCHRONIZATION OF SHARED IDENTIFIERS ACROSS SERVERS IN AN IMS NETWORK

(75) Inventors: Nagesh Kumar Bollapalli, Bangalore (IN); Siddharth Toshniwal, Kadugodi (IN); Sudharsanakrishnan Padmanabhan, Bangalore (IN); Srinivasan Krishnamoorthy, Nashua, NH (US); Srimannarayana Chary, Westford, MA (US)

(73) Assignee: SONUS NETWORKS, INC., Westford, MA (US)

( * ) Notice: Subject to any disclaimer, the term of this patent is extended or adjusted under 35 U.S.C. 154(b) by 983 days.

(21) Appl. No.: 13/153,999

(22) Filed: Jun. 6, 2011

(65) Prior Publication Data

US 2012/0307844 A1 Dec. 6, 2012

(51) Int. Cl.
*H04J 3/06* (2006.01)
*H04L 29/06* (2006.01)
*H04L 29/08* (2006.01)

(52) U.S. Cl.
CPC ........... *H04J 3/0638* (2013.01); *H04L 65/1016* (2013.01); *H04L 65/1073* (2013.01); *H04L 67/16* (2013.01)

(58) Field of Classification Search
None
See application file for complete search history.

(56) References Cited

U.S. PATENT DOCUMENTS

| 7,613,705 B2 | 11/2009 | Ayers et al. ..................... 707/10 |
| 7,643,626 B2 | 1/2010 | Haase et al. ............. 379/201.03 |
| 2008/0176538 A1 | 7/2008 | Terrill et al. ............... 455/414.1 |
| 2010/0100614 A1 | 4/2010 | Qiu et al. ....................... 709/223 |
| 2011/0026460 A1 | 2/2011 | Lafuente Alvarez et al. . 370/328 |

OTHER PUBLICATIONS

3GPP; 3GPP TS 29.329 V.9.2.0 (Jun. 2010), pp. 1-21.*
3GPP; 3GPP TS 29.228 V.5.22.0 (Dec. 2010), pp. 1-50.*
3GPP; 3GPP TS 29.328 V.9.2.0 (Jun. 2010), pp. 1-49.*
3GPP TS 23.078; V9.4.0; 3$^{rd}$ Generation Partnership Project; Technical Specification Group Core Network and Terminals; Cx and Dx interfaces based on the Diameter protocol; Protocol details (Release 9) (Jun. 2011); 36 pgs.

* cited by examiner

*Primary Examiner* — Hassan Phillips
*Assistant Examiner* — Mark A Mais
(74) *Attorney, Agent, or Firm* — Straub & Pokotylo; Michael P. Straub; Stephen T. Straub

(57) ABSTRACT

Methods and apparatuses, including computer program products, are described for synchronization of shared initial filter criteria in an IP Multimedia Subsystem (IMS) network. A first computing device in the IMS network transmits a registration request to a second computing device in the IMS network. The first computing device receives a response to the registration request from the second computing device, including an identifier associated with a shared initial filter criteria set stored at the first computing device. The first computing device determines whether the shared initial filter criteria set corresponding to the identifier is stored at the first computing device and transmits a retrieval request to the second computing device if the shared initial filter criteria set corresponding to the identifier is not stored. The first computing device receives the shared initial filter criteria set from the second computing device, and stores the shared initial filter criteria set.

11 Claims, 7 Drawing Sheets

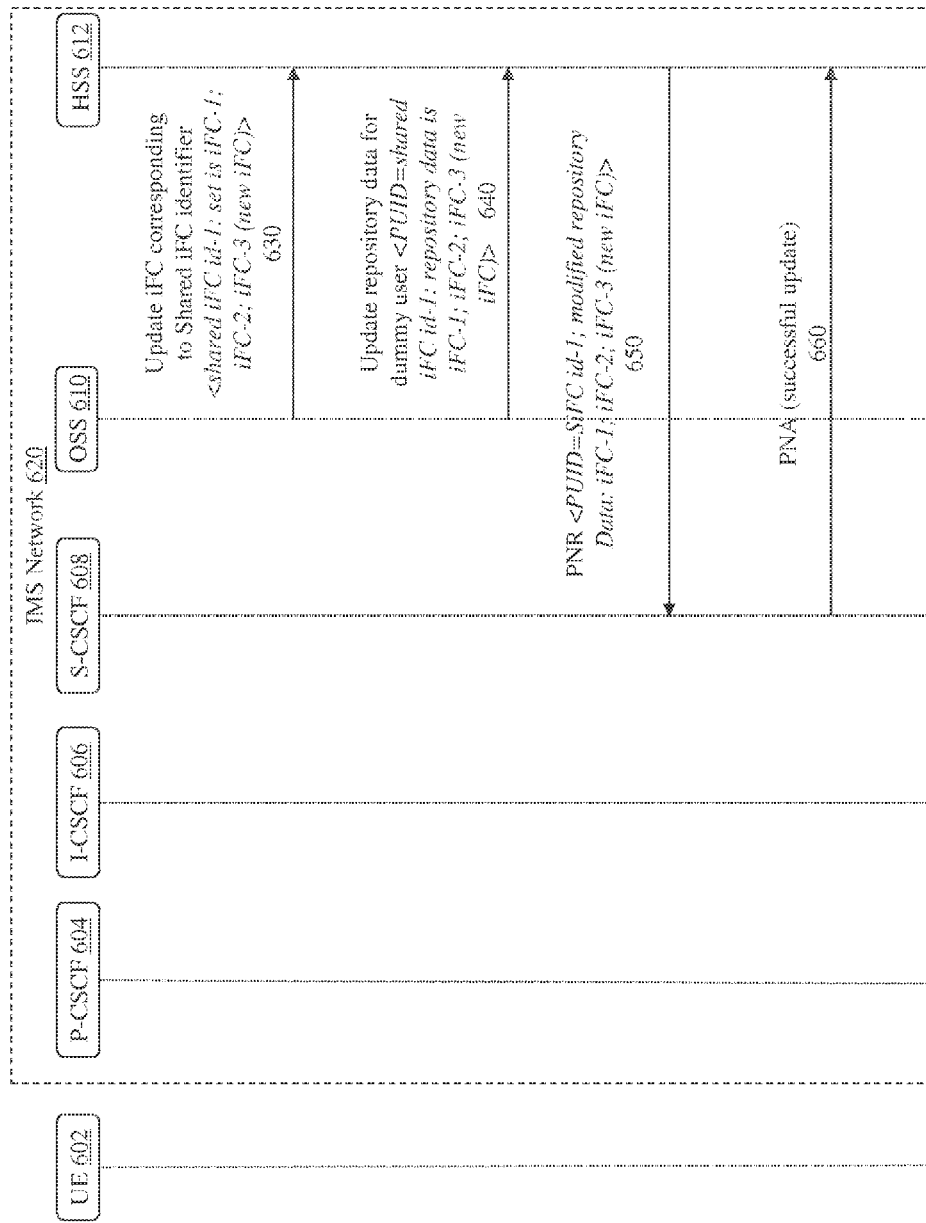

SYNCHRONIZATION OF SHARED IDENTIFIERS ACROSS SERVERS IN AN IMS NETWORK

FIELD OF THE INVENTION

The subject matter of this application relates generally to methods and apparatuses, including computer program products, for synchronizing shared identifiers across servers in an Internet Protocol Multimedia Subsystem (IMS) network.

BACKGROUND OF THE INVENTION

Session Initiation Protocol (SIP) is an application level protocol for creating, modifying and terminating multimedia sessions. Today, it is used for establishing and terminating voice, video, and/or messaging sessions over IP. Other feasible application examples include streaming multimedia distribution, sharing presence information, file transfer and online gaming.

An IMS network is an architectural framework for providing Internet Protocol (IP) multimedia services (e.g., Voice-over-IP telephony) to subscribers. Frequently, an IMS network utilizes SIP for session management and Session Description Protocol (SDP) for media negotiation. The IMS network generally includes three different layers: the application layer, the session layer, and the transport layer. The application layer includes application servers that provide various types of call support services to the subscribers. The session layer (also known as the IMS core network) manages user authentication, user equipment (UE) registration, and routing of signaling and other call-related packets between the application layer and the transport layer. The transport layer includes gateways that interface with various external networks (e.g., PSTN, Internet) and performs call control protocol conversion and transformation.

Various types of Call Session Control Function (CSCF) nodes (e.g., Proxy CSCF, Interrogating CSCF, Serving CSCF) are included as part of the session layer. The Serving CSCF (S-CSCF) nodes are generally configured as the central nodes in the session layer. The S-CSCF nodes perform several aspects of session control including, for example, handling UE registrations, determining to which application server(s) to forward messages, and enforcing policies of the IMS network operator. Any given deployment of an IMS network can include multiple S-CSCF nodes. The particular S-CSCF node that registers the UE of a subscriber is assigned dynamically at the time of UE registration. In addition, all subsequent messages from the UE are routed to the same S-CSCF node using standard IMS procedures.

Once the S-CSCF node is assigned, the Home Subscriber Server (HSS) stores the SIP Uniform Resource Locator (URL) for the assigned S-CSCF node against the SIP Address of Record (AOR) for the user. The Interrogating CSCF (I-CSCF) node queries the HSS to route subsequent registrations and terminating session setup requests to the assigned S-CSCF node.

The HSS is the central subscriber data repository for the network. The HSS stores the subscriber data which may include public user identities (e.g., SIP AOR) that the user may use, credentials to authenticate the user, and service settings for the user. The subscriber data stored at the HSS also contains the IMS service profile that is downloaded by the S-CSCF at the time of registration. This service profile contains a set of initial Filter Criteria (iFC) which instruct the S-CSCF as to which Application Servers should be chained in at the time of a session being established for the user. Each iFC contains a unique priority, a set of conditions which need to be evaluated against a received SIP message and, if the conditions match, an application server URI to which the request shall be forwarded.

The IMS standard also describes an extension to the service profile called shared iFC. If both the HSS and the S-CSCF support shared iFC, subsets of iFC may be shared by several service profiles. In this case, the HSS downloads the shared iFC sets implicitly by sending only the unique identifiers of the shared iFC sets to the S-CSCF. The S-CSCF is then expected to map each of the downloaded identifiers to its constituent iFC using a mechanism that is not specified in the IMS standard. For example, the identifier to iFC set mapping could be in a local database at the S-CSCF or in a shared database accessible to all S-CSCF nodes.

FIG. 1 is a diagram illustrating a typical call flow for registering a UE with an IMS network using inline initial filter criteria downloaded from the HSS. The IMS network 120 includes a P-CSCF node 104, an I-CSCF node 106, a S-CSCF node 108, an Application Server (AS) 110 and a HSS 112. The UE 102 connects to the IMS network 120 and attempts to register with the IMS network to access services provided by application servers (e.g., AS 110) in the IMS network. The first phase of registration is an authentication phase 130. During the authentication phase 130, the UE 102 sends a REGISTER message (step 130*a*) to the P-CSCF node 104, which transmits the REGISTER message (step 130*b*) to the I-CSCF node 106.

The I-CSCF node 106 then transmits a User-Authorization-Request (UAR) command (step 130*c*) to the HSS 112 in order to discover whether there is already a S-CSCF node bound to the requesting UE 102. The HSS 112 returns a User-Authorization-Answer (UAA) command (step 130*d*) to the I-CSCF node 106. The UAA may contain a S-CSCF name if the UE 102 is already bound to a particular S-CSCF node, or the UAA may contain S-CSCF capabilities that the I-CSCF node 106 can use to select a S-CSCF node (e.g., S-CSCF 108) to service the UE 102 in the event that the UE is not yet bound to a particular S-CSCF node (e.g., UE 102 was recently powered on).

Upon receipt of the UAA, the I-CSCF 106 selects and assigns a S-CSCF node 108 to the UE 102 using the S-CSCF capabilities received from the HSS 112 in the UAA. The I-CSCF 106 then forwards the REGISTER message (step 130*e*) to the assigned S-CSCF 108. The S-CSCF 108 transmits a Multimedia-Auth-Request (MAR) command (step 130*f*) to the HSS 112, indicating the URI associated with the assigned S-CSCF node 108. The HSS 112 stores the received S-CSCF URI and responds with a Multimedia-Auth-Answer (MAA) command (step 130*g*) that contains, among other information, authentication data associated with the UE 102. The S-CSCF node 108 then returns a "401 (Unauthorized)" message (steps 130*h*, 130*i* and 130*j*) to the UE 102 via the I-CSCF 106 and the P-CSCF 104. The "401 (Unauthorized)" message includes an authentication challenge that the UE 102 is directed to answer.

The second phase of registration (phase 140) begins with the UE 102 transmitting a new REGISTER message (step 140*a*) to the P-CSCF node 104 in response to the authentication challenge. The P-CSCF node 104 transmits the new REGISTER message (step 140*b*) to the I-CSCF 106, which queries the HSS 112 for the URI of the assigned S-CSCF node 108 via the use of a UAR command (step 140*c*). The HSS 112 responds to the I-CSCF 106 with a UAA command (step 140*d*) containing, among other information, the URI for the assigned S-CSCF 108.

The I-CSCF 106 then routes the new REGISTER message (step 140e) to the S-CSCF 108 by using the URI retrieved from the HSS 112. The S-CSCF node 108 validates the credentials contained in the new REGISTER message against the credentials that the S-CSCF had previously retrieved from the HSS 112 (in steps 130f and 130g). If the credentials are successfully validated, the S-CSCF 108 sends a Server-Assignment-Request (SAR) command (step 140f) to the HSS 112 for the purpose of informing the HSS that the UE 102 is now registered and to download the user profile associated with the UE 102. The HSS 112 responds with a Server-Assignment-Answer (SAA) command (step 140g) containing iFC of the retrieved user profile as inline data. As shown in FIG. 1, the SAA command contains "<iFC-1: priority 1, conditions, AS-1; iFC-2: priority 2, conditions, AS-2>".

Upon receiving the SAA command containing the iFC, the S-CSCF node 108 transmits a "200 OK" message (steps 140h, 140i and 140j) to the UE 102 via the I-CSCF 106 and P-CSCF 104. The "200 OK" message indicates the success of the REGISTER request to the UE 102. At this point, the registration procedure is complete.

FIG. 2 is a diagram illustrating a typical call flow for registering a UE with an IMS using shared initial filter criteria downloaded from the HSS. The IMS network 220 includes a P-CSCF node 204, an I-CSCF node 206, a S-CSCF node 208, an AS 210 and a HSS 212. The UE 202 connects to the IMS network 220 and attempts to register with the IMS network to access services provided by application servers (e.g., AS 210) in the IMS network. The first phase of registration is an authentication phase 230. During the authentication phase 230, the UE 202 sends a REGISTER message (step 230a) to the P-CSCF node 204, which transmits the REGISTER message (step 230b) to the I-CSCF node 206.

The I-CSCF node 206 then transmits a UAR command (step 230c) to the HSS 212 in order to discover whether there is already a S-CSCF node bound to the requesting UE 202. The HSS 212 returns a UAA command (step 230d) to the I-CSCF node 206. The UAA may contain a S-CSCF name if the UE 202 is already bound to a particular S-CSCF node, or the UAA may contain S-CSCF capabilities that the I-CSCF node 206 can use to select a S-CSCF node (e.g., S-CSCF 208) to service the UE 202 in the event that the UE is not yet bound to a particular S-CSCF node (e.g., UE 202 was recently powered on).

Upon receipt of the UAA, the I-CSCF 206 selects and assigns a S-CSCF node 208 to the UE 202 using the S-CSCF capabilities received from the HSS 212 in the UAA. The I-CSCF 206 then forwards the REGISTER message (step 230e) to the assigned S-CSCF 208. The S-CSCF 208 transmits a MAR command (step 230f) to the HSS 212, indicating the URI associated with the assigned S-CSCF node 208. The HSS 212 stores the received S-CSCF URI and responds with a MAA command (step 230g) that contains, among other information, authentication data associated with the UE 202. The S-CSCF node 208 then returns a "401 (Unauthorized)" message (steps 230h, 230i and 230j) to the UE 202 via the I-CSCF 206 and the P-CSCF 204. The "401 (Unauthorized)" message includes an authentication challenge that the UE 202 is directed to answer.

The second phase of registration (phase 240) begins with the UE 202 transmitting a new REGISTER message (step 240a) to the P-CSCF node 204 in response to the authentication challenge. The P-CSCF node 204 transmits the new REGISTER message (step 240b) to the I-CSCF 206, which queries the HSS 212 for the URI of the assigned S-CSCF node 208 via the use of a UAR command (step 240c). The HSS 212 responds to the I-CSCF 206 with a UAA command (step 240d) containing, among other information, the URI for the assigned S-CSCF 208.

The I-CSCF 206 then routes the new REGISTER message (step 240e) to the S-CSCF 208 by using the URI retrieved from the HSS 212. The S-CSCF node 208 validates the credentials contained in the new REGISTER message against the credentials that the S-CSCF had previously retrieved from the HSS 212 (in steps 230f and 230g). If the credentials are successfully validated, the S-CSCF 208 sends a SAR command (step 240f) to the HSS 212 for the purpose of informing the HSS that the UE 202 is now registered and to download the user profile associated with the UE 202. The HSS 212 responds with a SAA command (step 240g) containing a shared iFC identifier of the retrieved user profile as inline data, instead of the complete iFC as described above with respect to FIG. 1. As shown in FIG. 2, the SAA command contains "<SiFC id: x>" where "x" is the shared iFC identifier.

Upon receiving the SAA command containing the shared iFC identifier, the S-CSCF node 208 maps the identifier to a list of iFC stored at the S-CSCF, and retrieves the iFC associated with the shared iFC identifier. The S-CSCF 208 uses the retrieved iFC for subsequent call processing. The S-CSCF 208 then transmits a "200 OK" message (steps 240h, 240i and 240j) to the UE 202 via the I-CSCF 206 and P-CSCF 204. The "200 OK" message indicates the success of the REGISTER request to the UE 202. At this point, the registration procedure is complete.

Generally, the usage of shared iFC between a HSS and a S-CSCF is desirable for at least the following reasons:

Easier provisioning: With shared iFC, a single copy of the shared data set is provisioned at the HSS instead of multiple copies of the iFC (i.e., one for every subscriber).

Faster processing and less resource consumption at the S-CSCF: Shared iFC allows a lesser amount of data to be exchanged between the S-CSCF and the HSS in registration flows because only the iFC identifier is passed as opposed to the iFC being sent as inline data. A result is faster profile parsing as well as efficient data storage at the S-CSCF (i.e., a single copy of the shared data can be referenced from multiple service profiles as opposed to multiple in-memory copies, one for each subscriber's profile).

Easier to update: In case of inline iFC being sent to the S-CSCF, if an iFC that is shared by all subscribers is altered at run-time, it results in significant traffic (e.g., one Diameter PPR per registered subscriber) between the HSS and the S-CSCF nodes. In case of shared iFC, any update of the shared data set results in one update notification which internally updates the profiles for all subscribers.

When using shared iFC between the S-CSCF and the HSS, however, the IMS standards do not define the mechanisms to ensure provisioning of the same shared iFC set and its identifier at both the HSS and the S-CSCF. For example, if these network elements are provided by different vendors, there is presently a lack of a well-defined provisioning interface in the IMS standards that both the S-CSCF and the HSS must adhere to for shared iFC installation.

Also, the IMS standards do not presently define the mechanism to update the shared iFC set (or the identifiers) at both the HSS and the S-CSCF. This problem is compounded by the fact that if there are multiple HSS servers (e.g., for geo-redundancy) and multiple S-CSCF nodes (e.g., for network scalability), the shared iFC do not need to be synchronized between only two databases but must be synchronized across multiple databases. Therefore, what is needed is a mechanism to provision shared iFC and to update them at a later point of time such that all of the HSS servers and all of the S-CSCF nodes in an IMS network are in sync at any point of time with regard to the shared iFC.

SUMMARY OF THE INVENTION

In general overview, the techniques described herein are related to synchronization of shared identifiers and related initial filter criteria information across servers in an IMS network. The techniques advantageously provide for configuration of a single node in the IMS network as a shared database that can be accessed using existing non-proprietary interfaces that shield the network from exposure to security risks. Also, operators of IMS networks can achieve reduced processing overhead and lighter network traffic because frequently-accessed user data, such as user service profiles and corresponding shared initial filter criteria, is stored at a central subscriber repository having high availability and persistence. The high availability and persistence of the shared information leads to better preservation and wider availability of the shared information to other nodes in the network.

The invention, in one aspect, features a method for synchronization of shared initial filter criteria in an IP Multimedia Subsystem (IMS) network. The method includes transmitting, by a first computing device in the IMS network, a registration request to a second computing device in the IMS network. The method also includes receiving, at the first computing device, a response to the registration request from the second computing device. The response includes an identifier associated with a shared initial filter criteria set stored at the first computing device. The method also includes determining, by the first computing device, whether the shared initial filter criteria set corresponding to the identifier is stored at the first computing device and transmitting, by the first computing device, a retrieval request including the identifier to the second computing device if the shared initial filter criteria set corresponding to the identifier is not stored at the first computing device. The method also includes receiving, at the first computing device, the shared initial filter criteria set corresponding to the identifier from the second computing device in response to the retrieval request, and storing, at the first computing device, the shared initial filter criteria set.

The invention, in another aspect, features a system for synchronization of shared initial filter criteria in an IP Multimedia Subsystem (IMS) network. The system includes a first computing device in the IMS network configured to transmit a registration request to a second computing device in the IMS network and receive a response to the registration request from the second computing device. The response includes an identifier associated with a shared initial filter criteria set stored at the first computing device. The first computing device is also configured to determine whether the shared initial filter criteria set corresponding to the identifier is stored at the first computing device and to transmit a retrieval request including the identifier to the second computing device if the shared initial filter criteria set corresponding to the identifier is not stored at the first computing device. The first computing device is also configured to receive the shared initial filter criteria set corresponding to the identifier from the second computing device in response to the retrieval request, and store the shared initial filter criteria set.

The invention, in another aspect, features a computer program product, tangibly embodied in a computer-readable storage medium, for synchronization of shared initial filter criteria in an IP Multimedia Subsystem (IMS) network. The computer program product includes instructions operable to cause a first computing device in the IMS network to transmit a registration request to a second computing device in the IMS network and receive a response to the registration request from the second computing device. The response includes an identifier associated with a shared initial filter criteria set stored at the first computing device. The computer program product also includes instructions operable to cause the first computing device to determine whether the shared initial filter criteria set corresponding to the identifier is stored at the first computing device and transmit a retrieval request including the identifier to the second computing device if the shared initial filter criteria set corresponding to the identifier is not stored at the first computing device. The computer program product includes instructions operable to cause the first computing device to receive the shared initial filter criteria set corresponding to the identifier from the second computing device in response to the retrieval request and store the shared initial filter criteria set.

The invention, in another aspect, features a system for synchronization of shared initial filter criteria in an IP Multimedia Subsystem (IMS) network. The system includes means for transmitting, by a first computing device in the IMS network, a registration request to a second computing device in the IMS network and means for receiving, at the first computing device, a response to the registration request from the second computing device. The response includes an identifier associated with a shared initial filter criteria set stored at the first computing device. The system also includes means for determining, by the first computing device, whether the shared initial filter criteria set corresponding to the identifier is stored at the first computing device and means for transmitting, by the first computing device, a retrieval request including the identifier to the second computing device if the shared initial filter criteria set corresponding to the identifier is not stored at the first computing device. The system also includes means for receiving, at the first computing device, the shared initial filter criteria set corresponding to the identifier from the second computing device in response to the retrieval request and means for storing, at the first computing device, the shared initial filter criteria set.

In some embodiments, any of the above aspects can include one or more of the following features. In some embodiments, the first computing device and the second computing device communicate using an IMS interface. In some embodiments, the IMS interface is a Sh interface. In some embodiments, the retrieval request is a Diameter SNR query and the response to the retrieval request is a Diameter SNA message.

In some embodiments, the IMS interface is a Cx interface. In some embodiments, the retrieval request is a Diameter SAR request and the response to the retrieval request is a Diameter SAA message.

In some embodiments, an update to the shared initial filter criteria set is received by the first computing device from the second computing device. In some embodiments, the update received by the first computing device is based on a subscription to the second computing device. In some embodiments, the subscription is created by the second computing device based on receipt of the retrieval request.

In some embodiments, the determining step includes retrieving, based on the identifier, a shared initial filter criteria set stored at the first computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6 is a call flow diagram of a process for updating shared initial filter criteria as repository data at an HSS in an IMS network.

DETAILED DESCRIPTION

Figure 1:
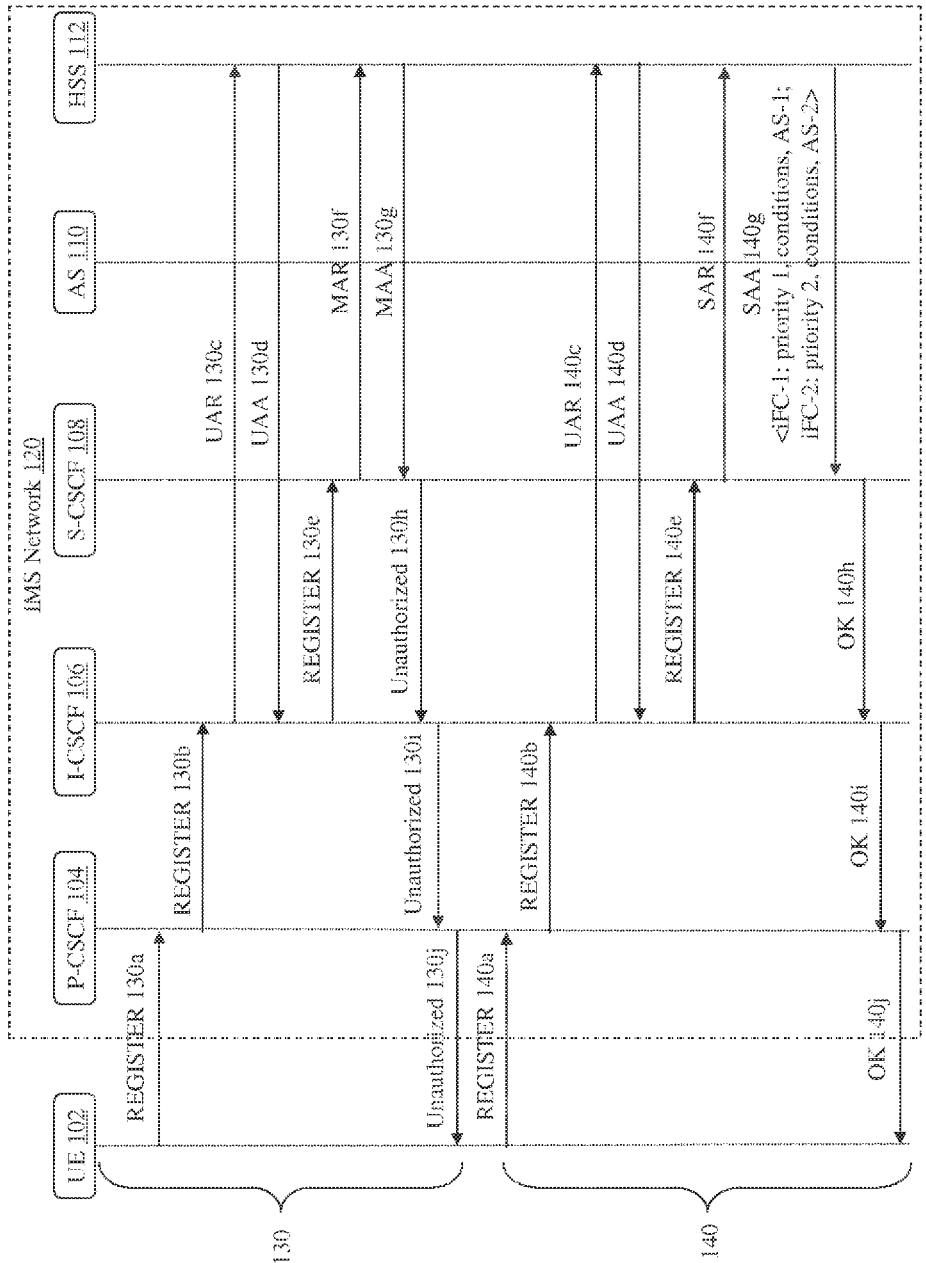
FIG. 1 is a diagram illustrating a typical call flow for registering a UE with an IMS network using inline initial filter criteria downloaded from the HSS.
Figure 2:
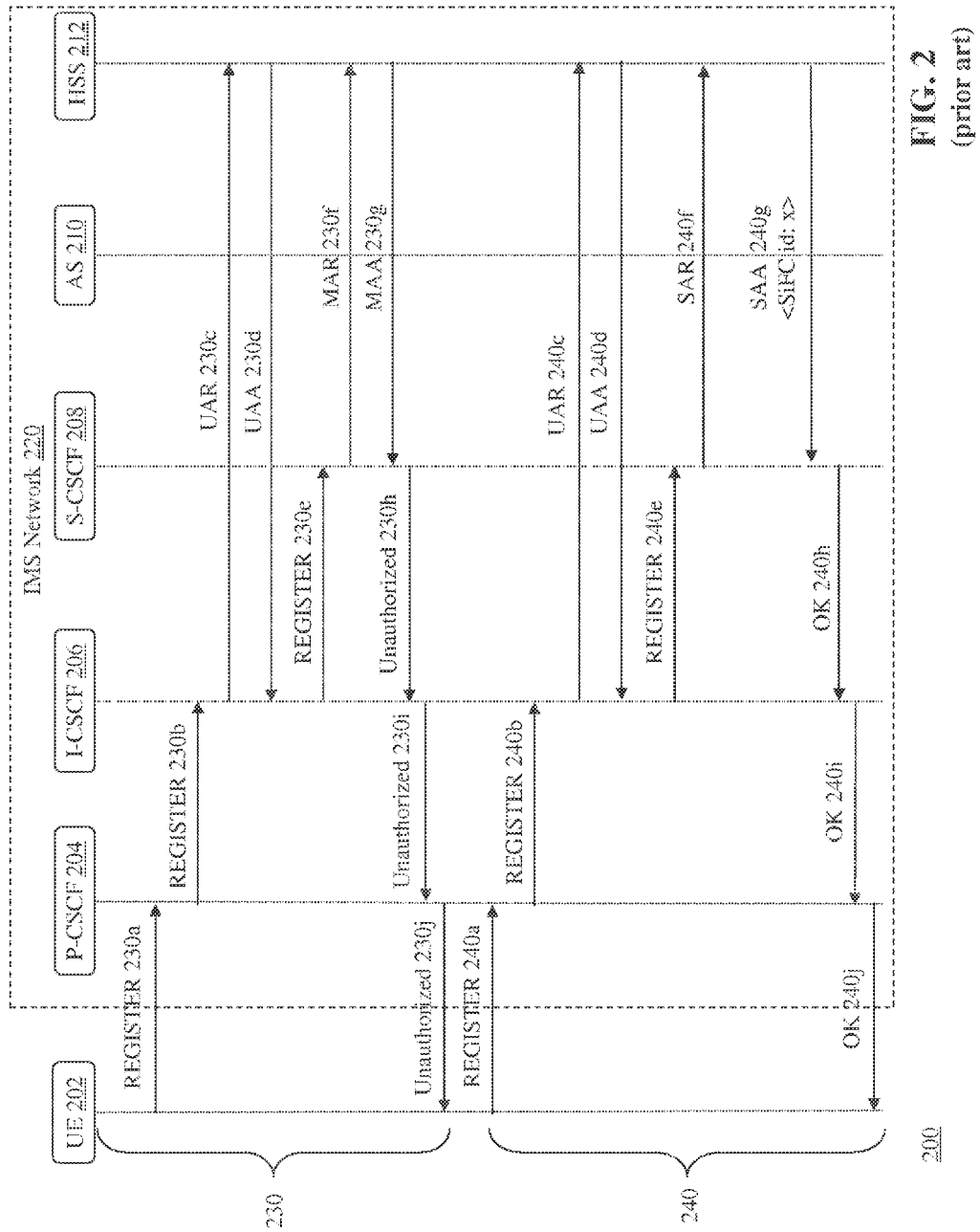
FIG. 2 is a diagram illustrating a typical call flow for registering a UE with an IMS using shared initial filter criteria downloaded from the HSS.
Figure 3:
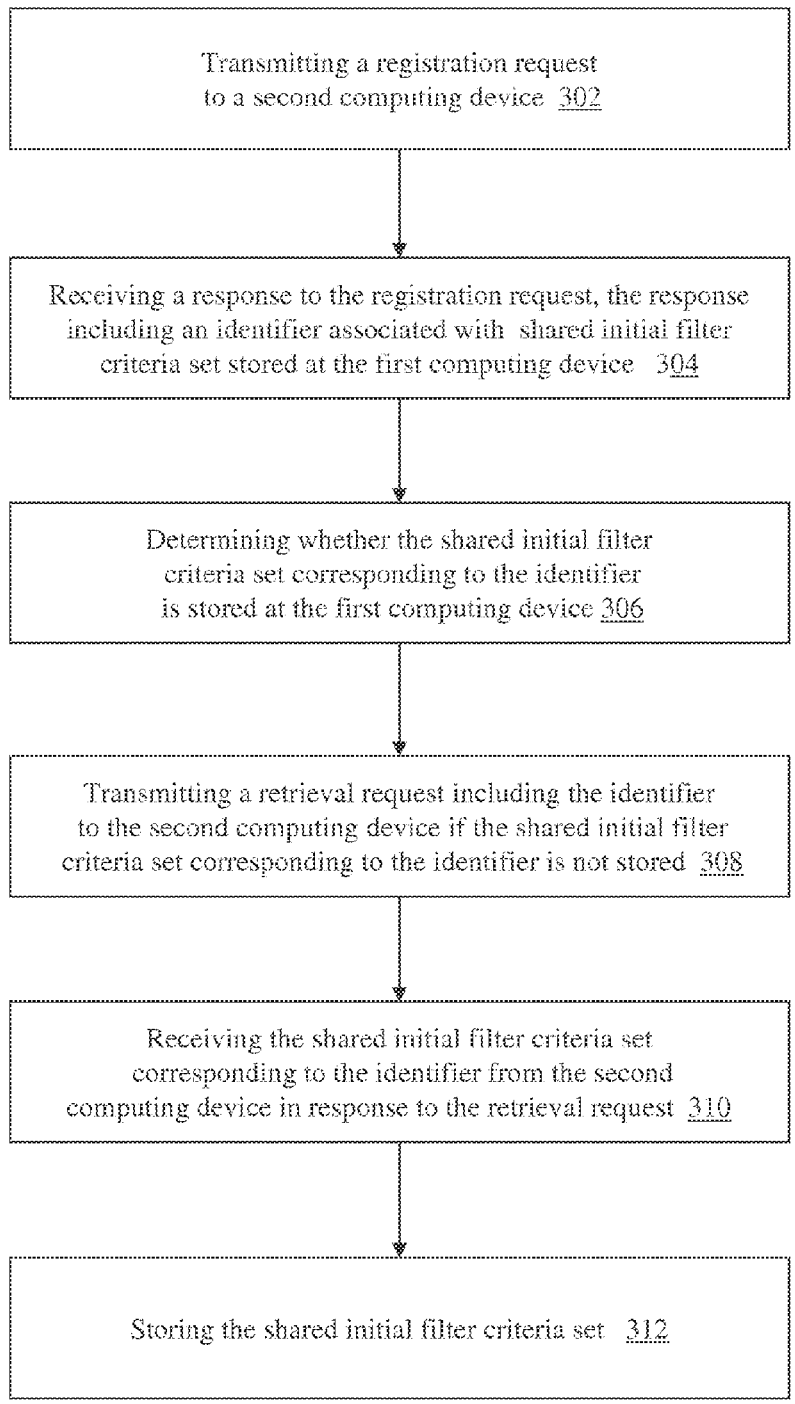
FIG. 3 is a flow diagram of a process for synchronizing shared identifiers across servers in an IMS network.

FIG. 3 is a flow diagram of a process 300 for synchronizing shared identifiers across servers in an IMS network. A first computing device (e.g., a S-CSCF node in an IMS network) transmits (302) a registration request to a second computing device (e.g., an HSS). In some embodiments, the registration request is associated with a remote UE (e.g., a mobile handset) that attempts to connect to the IMS network. The first computing device receives (304) a response to the registration request from the second computing device, where the response includes an identifier associated with a shared initial filter criteria set stored at the first computing device.

Upon receiving the response, the first computing device determines (306) whether the shared initial filter criteria set corresponding to the received identifier is actually stored at the first computing device. If the first computing device determines that the shared initial filter criteria set is not stored, the first computing device transmits (308) a retrieval request to the second computing device, where the retrieval request includes the received identifier. The first computing device receives (310) from the second computing device the shared initial filter criteria set corresponding to the identifier. The first computing device stores (312) the shared initial filter criteria set received from the second computing device.

Provisioning Shared Initial Filter Criteria as Repository Data

The HSS in an IMS network supports storage of application server provisioned data (e.g., service settings, service authorization rules) to permit a pool of application servers to co-operate with each other and share the provisioned data. The HSS is not required to understand the application server provisioned data, so the provisioned data can be stored as transparent data (or repository data) at the HSS. The repository data can be retrieved by any authorized application server using, for example, the Diameter Sh interface. In other embodiments, the Diameter Cx interface can be used to retrieve repository data.

Generally, the Diameter Sh interface is defined between an AS or an Open Service Access-Service Capability Server (OSA-SCS) and an HSS. The Sh interface provides data storage and retrieval functionality, such as an AS downloading data from an HSS or an AS uploading data to an HSS. The Sh interface also provides a subscription and notification service, so that another server can subscribe to changes stored in the HSS. When such data changes in the HSS, the HSS notifies the subscribed server.

Figure 4:
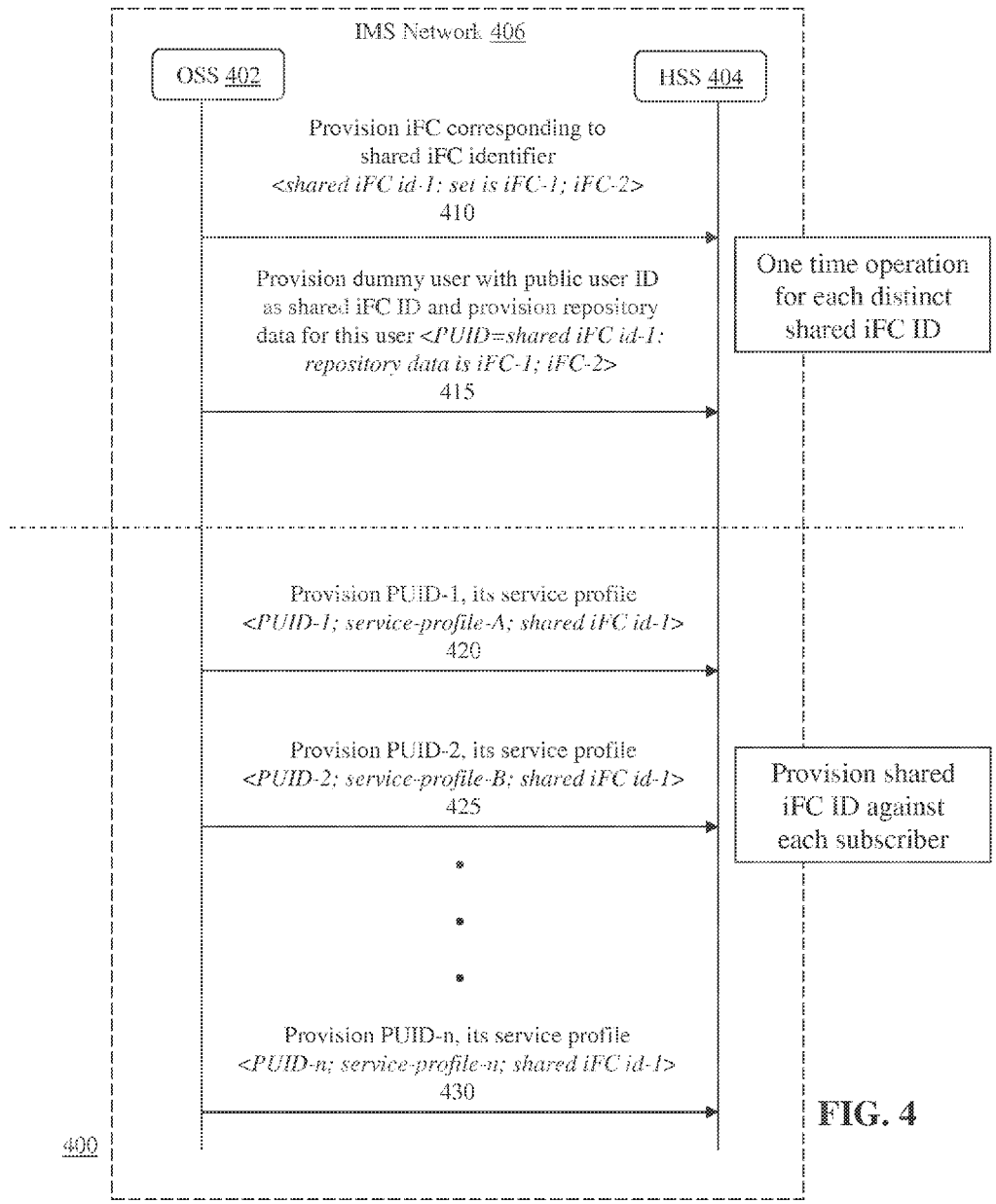
FIG. 4 is a flow diagram of a process for provisioning shared initial filter criteria and the identifiers associated with the shared initial filter criteria as repository data at an HSS in an IMS network.

FIG. 4 is a flow diagram of a process 400 for provisioning shared initial filter criteria and the identifiers associated with the shared initial filter criteria as repository data at a HSS 404 in an IMS network 406. An Operations Support System (OSS) 402, operated and managed by the service provider that operates the IMS network 406, provisions (410) iFC corresponding to the shared iFC identifier at an HSS 404 in the IMS network 406. The OSS 402 transmits the shared iFC set information, including the shared iFC identifier, to the HSS 404. For example, the OSS 402 transmits the shared iFC set information as <shared iFC id-1: set is iFC-1; iFC-2>, where id-1 is the shared iFC identifier and iFC-1 and iFC-2 are the shared initial filter criteria that comprise the set. The HSS 404 stores the shared iFC set information as repository data (e.g., in a local database or a separate storage device connected to the HSS 404).

The OSS 402 then provisions (415) a dummy user profile (i.e., a user profile that does not directly correspond to an actual user of the system) at the HSS 404. The public user ID (PUID) of the dummy profile is set to the shared iFC ID (e.g., id-1). The OSS 402 also provisions (415) iFC as repository data for the dummy user profile at the HSS 404. The OSS 402 transmits the shared iFC set information, including the shared iFC identifier as the public user ID, to the HSS 404. For example, the OSS 402 transmits the shared iFC set information as <PUID=shared iFC id-1; repository data is iFC-1; iFC-2>, where id-1 is the shared iFC identifier and iFC-1 and iFC-2 are the shared initial filter criteria that comprise the set.

It should be noted that provisioning of the shared initial filter criteria and the dummy user profile occur as a one-time operation between the OSS 402 and the HSS 404 for each distinct shared iFC ID.

The OSS 402 then provisions the shared iFC ID against each actual subscriber to the IMS network 406. The OSS 402 provisions the service profile of each public user ID to include the shared iFC ID previously provisioned at the HSS 404. For example, the OSS 402 provisions (420) the service profile of public user ID PUID-1 to include the shared iFC ID id-1 (e.g., <PUID-1; service-profile-A; shared iFC id-1>). The OSS 402 also provisions (425) the service profile of public user ID PUID-2 to include the shared iFC ID id-1, and continues with provisioning the service profiles of each of the remaining public user IDs (e.g., PUID-n in step 430) to include a reference to the shared iFC ID id-1.

An advantage of this technique is that the HSS 404 is thereafter configured as a shared database that can be accessed using the existing standards-based Diameter interface, as opposed to requiring proprietary access methods like Structured Query Language (SQL) queries performed by an S-CSCF to respective co-located databases or to a shared database other than the HSS 404. Use of such proprietary methods can lead to OR open security risks and often require additional processing overhead from the respective nodes in the IMS network and burden the network with increased traffic. Another advantage of provisioning data in this manner is that both copies of data (e.g., the user service profile and the corresponding shared iFC sets) are stored at a central subscriber repository (e.g., HSS 404), resulting in high availability and persistence of the shared iFC set. As long as the HSS 404 is highly available and provides persistence of provisioned data, the shared iFC set is preserved and available to other nodes in the network that request the shared iFC information.

Downloading Shared Initial Filter Criteria as Repository Data

Figure 5A:
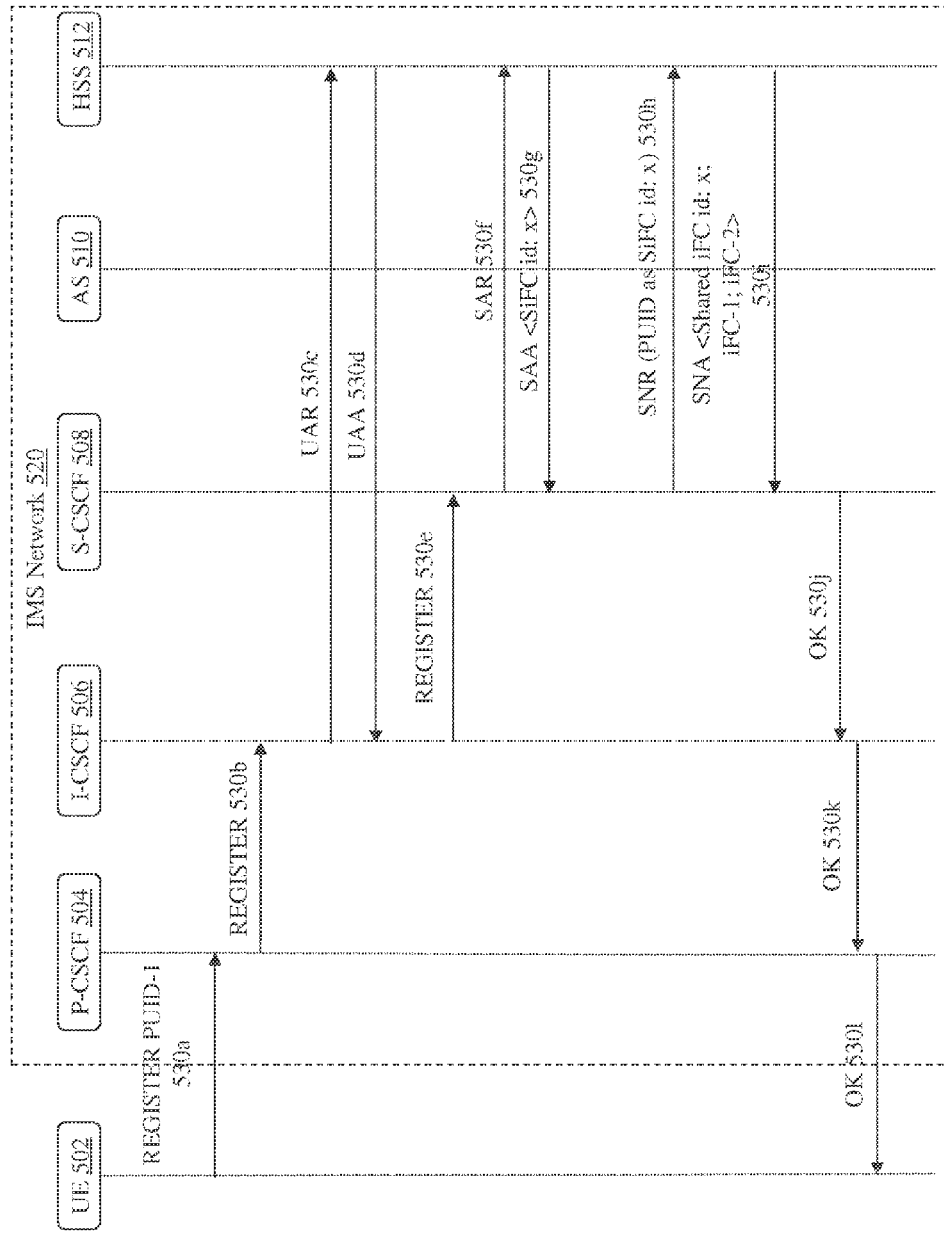
FIGS. 5A-5B are call flow diagrams of a process for downloading shared initial filter criteria as repository data from an HSS in an IMS network during registration of UE.
Figure 5B:
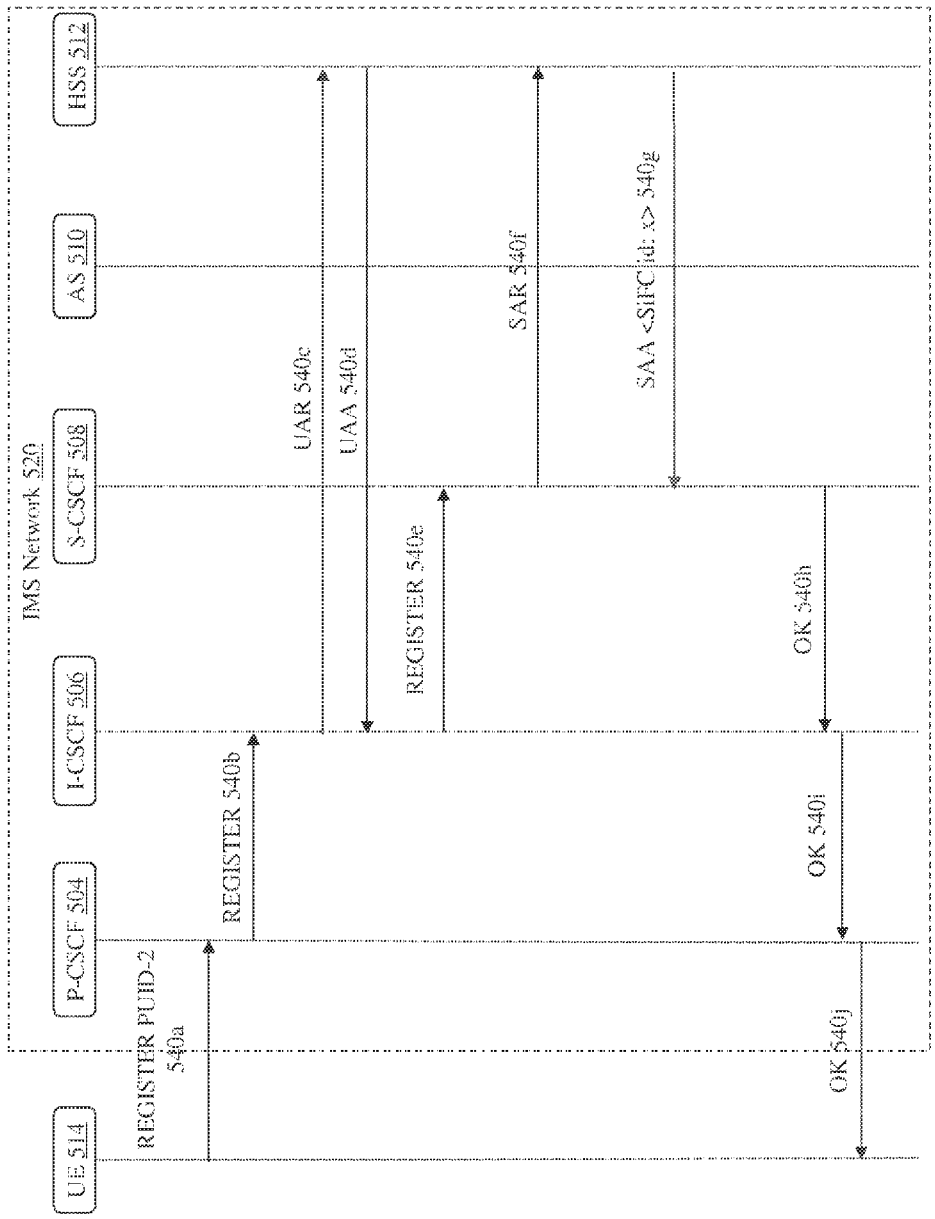

Once the shared iFC information has been provisioned at the HSS, the nodes in the IMS network can use the provisioned data during registration of UE attempting to connect to the IMS network. FIGS. 5A-5B are call flow diagrams of a process 500 for downloading shared initial filter criteria as repository data from an HSS 512 in an IMS network 520 during registration of UE 502. Referring to FIG. 5A, the IMS network 520 includes a P-CSCF node 504, an I-CSCF node 506, a S-CSCF node 508, an AS 510 and an HSS 512.

UE 502 transmits a REGISTER message (step 530a) to the P-CSCF node 504. The REGISTER message includes a public user ID (e.g., PUID-1) associated with the UE 502. The P-CSCF 504 transmits the REGISTER message (step 530b) to the I-CSCF node 506.

The I-CSCF node 506 then transmits a UAR command (step 530c) to the HSS 512 in order to discover whether there is already a S-CSCF node bound to the requesting UE 502. The HSS 512 returns a UAA command (step 530d) to the I-CSCF node 506. The UAA may contain a S-CSCF name if the UE 502 is already bound to a particular S-CSCF node, or the UAA may contain S-CSCF capabilities that the I-CSCF node 506 can use to select a S-CSCF node (e.g., S-CSCF 508) to service the UE 502 in the event that the UE is not yet bound to a particular S-CSCF node (e.g., UE 502 was recently powered on).

Upon receipt of the UAA, the I-CSCF 506 selects and assigns a S-CSCF node 508 to the UE 502 using the S-CSCF capabilities received from the HSS 512 in the UAA. The I-CSCF 506 then forwards the REGISTER message (step 530e) to the assigned S-CSCF 508. It should be noted that this example assumed that the UE has been successfully authenticated. The S-CSCF 508 then sends a SAR command (step 530f) to the HSS 512 for the purpose of informing the HSS that the UE 502 is now registered and to download the user profile associated with the UE 502. The HSS 512 responds with a SAA command (step 530g) containing a shared iFC identifier of the retrieved user profile as inline data, instead of the complete iFC information. As shown in FIG. 5A, the SAA command contains "<SiFC id: x>" where 'x' is the shared iFC identifier.

The S-CSCF 508 determines whether it has already received and locally stored the shared iFC information associated with the shared iFC ID (e.g., 'x'). If the S-CSCF node 508 determines that it has not yet received and stored the shared iFC information associated with shared iFC ID x, the S-CSCF 508 transmits a Subscribe-Notifications-Request (SNR) command (step 530h) to the HSS 512 via the Diameter Sh interface. The SNR command includes the shared iFC ID x as the public user ID. The HSS 512 transmits a Subscribe-Notifications-Answer (SNA) command (step 530i) to the S-CSCF 508 that contains the shared iFC set associated with the shared iFC ID x. It should be noted that the provisioning phase had created the shared iFC set for iFC ID x at the HSS 512, and the provisioning phase had also created the dummy user profile with a public user ID of x and corresponding repository data of the shared iFC set. Based on receiving the SNR from the S-CSCF 508, the HSS 512 also creates a subscription associating the S-CSCF 508 with the shared iFC ID such that the S-CSCF is subsequently notified by the HSS 512 in the event of updates or changes to the shared iFC set for the shared iFC ID.

Upon receiving the SNA command containing the shared iFC set, the S-CSCF node 508 stores the received shared iFC information (e.g., in a local cache). The S-CSCF 508 uses the received iFC information for subsequent call processing. The S-CSCF 508 then transmits a "200 OK" message (steps 530j, 530k and 530l) to the UE 502 via the I-CSCF 506 and P-CSCF 504. The "200 OK" message indicates the success of the REGISTER request to the UE 502. At this point, the registration procedure for UE 502 is complete.

Referring now to FIG. 5B, another UE 514 with a different public user ID (PUID-2) initiates a registration procedure with the IMS network 520. The UE 514 transmits a REGISTER message (step 540a) to the P-CSCF node 504. The REGISTER message includes the public user ID PUID-2 associated with the UE 514. The P-CSCF 504 transmits the REGISTER message (step 540b) to the I-CSCF node 506.

The I-CSCF node 506 then transmits a UAR command (step 540c) to the HSS 512 in order to discover whether there is already a S-CSCF node bound to the requesting UE 514. The HSS 512 returns a UAA command (step 540d) to the I-CSCF node 506. The UAA may contain a S-CSCF name if the UE 514 is already bound to a particular S-CSCF node, or the UAA may contain S-CSCF capabilities that the I-CSCF node 506 can use to select a S-CSCF node (e.g., S-CSCF 508) to service the UE 514 in the event that the UE is not yet bound to a particular S-CSCF node (e.g., UE 514 was recently powered on).

Upon receipt of the UAA, the I-CSCF 506 selects and assigns a S-CSCF node 508 to the UE 514 using the S-CSCF capabilities received from the HSS 512 in the UAA. The I-CSCF 506 then forwards the REGISTER message (step 540e) to the assigned S-CSCF 508. It should be noted that this example assumed that the UE has been successfully authenticated. The S-CSCF 508 then sends a SAR command (step 540f) to the HSS 512 for the purpose of informing the HSS that the UE 514 is now registered and to download the user profile associated with the UE 514. The HSS 512 responds with a SAA command (step 540g) containing a shared iFC identifier of the retrieved user profile as inline data, instead of the complete iFC information. As shown in FIG. 5B, the SAA command contains "<SiFC id: x>" where 'x' is the shared iFC identifier.

The S-CSCF 508 determines whether it has already received and locally stored the shared iFC information associated with the shared iFC ID (e.g., 'x'). Because the S-CSCF node 508 had previously received and stored the shared iFC information associated with shared iFC ID x (see FIG. 5A), the S-CSCF 508 does not need to transmit a SNR command to the HSS 512 via the Diameter Sh interface for downloading the shared iFC information. Instead, the S-CSCF node 508 uses the previously stored iFC information associated with the shared iFC ID x for subsequent call processing. The S-CSCF 508 then transmits a "200 OK" message (steps 540h, 540i and 540j) to the UE 514 via the I-CSCF 506 and P-CSCF 504. The "200 OK" message indicates the success of the REGISTER request to the UE 514. At this point, the registration procedure for UE 514 is complete.

Updating Shared Initial Filter Criteria as Repository Data

A further element of the techniques described herein is the updating of shared iFC information that had been provisioned at the HSS. FIG. 6 is a call flow diagram of a process 600 for updating shared initial filter criteria as repository data at an HSS 612 in an IMS network 620. The IMS network 620 includes a P-CSCF node 604, an I-CSCF node 606, a S-CSCF node 608, an OSS 610 and an HSS 612.

The OSS 610 transmits to the HSS 612 an update of the iFC (step 630) corresponding to a shared iFC identifier. For example, the OSS 610 sends an update message of <shared iFC id-1: set is iFC-1; iFC-2; iFC-3>, where the shared iFC ID is id-1 and the shared iFC set comprises iFC-1, iFC-2 and new initial filter criteria iFC-3. The HSS 612 updates the repository data associated with the iFC ID id-1 with the new shared iFC information. The OSS 610 also transmits an update of the dummy user profile (step 640) having a public user ID corresponding to the same shared iFC identifier (e.g., id-1). For example, the OSS 610 sends an update message of <PUID=shared iFC id-1: repository data is iFC-1; iFC-2; iFC-3>, where the public user ID of the dummy profile is id-1 and the shared iFC set comprises iFC-1, iFC-2 and new initial filter criteria iFC-3.

It should be noted that this example assumes that the HSS 612 had already created a subscription for S-CSCF node 608 to be notified of changes to the shared iFC information associated with shared iFC ID id-1, as described with regard to FIG. 5A above. Because the HSS 612 had created a subscription for S-CSCF 608, the HSS 612 transmits a Push-Notifications-Request (PNR) command (step 650) to the subscribing S-CSCF 608. The PNR command includes the public user ID as shared iFC ID id-1 and the modified repository data of iFC-1; iFC-2 and iFC-3. Upon receiving the PNR command, the S-CSCF 608 node determines whether it has already received and stored shared iFC information associated with shared iFC ID id-1. If the S-CSCF 608 has already received and stored the shared iFC information of id-1, the S-CSCF 608 updates the shared iFC set associated with id-1. The user service profiles stored at the S-CSCF 608 that reference shared iFC ID id-1 are updated automatically if the user service profiles utilize a pointer to the iFC set data storage or if the shared iFC set is loaded by the S-CSCF 608 prior to each iFC evaluation for the subscribers that use the service profiles. An advantage of this technique is that only a single PNR command is received by the S-CSCF 608, even if the service profiles of multiple subscribers refer to the shared iFC that was updated.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for synchronization of shared initial filter criteria in an IP Multimedia Subsystem (IMS) network, the method comprising:
   transmitting, by a first computing device in the IMS network, a server assignment request to a second computing device in the IMS network;
   receiving, at the first computing device, a response to the server assignment request from the second computing device, the response including an identifier stored at the first computing device and associated with a shared initial filter criteria set;
   determining, by the first computing device, whether the shared initial filter criteria set corresponding to the identifier is stored at the first computing device;
   transmitting, by the first computing device, a retrieval request including the identifier to the second computing device if the shared initial filter criteria set corresponding to the identifier is not currently available or not stored at the first computing device;
   receiving, at the first computing device, the shared initial filter criteria set corresponding to the identifier from the second computing device in response to the retrieval request;
   storing, at the first computing device, the shared initial filter criteria set;
   wherein the first computing device is a Serving-Call Session Control Function node and the second computing device is a Home Subscriber Server and said first and said second computing devices communicate using a Sh IMS interface;
   wherein said Serving-Call Session Control Function node and said Home Subscriber Server also communicate using a Cx IMS interface; and
   wherein said Home Subscriber Server is provisioned to include a dummy user profile having a public user identifier and repository data, said dummy public user identifier being the same as said identifier associated with said shared initial filter criteria set, and said repository data including said shared initial filter criteria set.

2. The method of claim 1:
   wherein the retrieval request is a Diameter SNR query message transmitted via said Sh interface, said Diameter SNR query message including a user identity field set to said dummy public user identity; and
   wherein the response to the retrieval request is a Diameter SNA message received via said Sh interface, said Diameter SNA message including said identifier associated with said shared initial filter criteria set and said shared initial filter criteria set from said repository data of said dummy user profile having said public user identifier the same as said shared initial filter criteria.

3. The method of claim 2, wherein the server assignment request is a Diameter SAR request transmitted via said Cx interface and the response to the retrieval request is a Diameter SAA message received via said Cx interface.

4. The method of claim 1, further comprising receiving, by the Serving-Call Session Control Function node, via said Sh interface, an update to the shared initial filter criteria set from the Home Subscriber Server when the shared initial filter criteria set stored as repository data in said dummy user profile with said public user identifier the same as said identifier associated with said shared initial filter criteria set is updated.

5. The method of claim 4, wherein the update to said shared initial filter criteria set received by said Serving-Call Session Control Function node is based on a subscription to the Home Subscriber Server.

6. The method of claim 5, further comprising creating, by the Home Subscriber Server, the subscription based on receipt of the retrieval request.

7. The method of claim 1, the determining step further comprising:
   retrieving, based on the identifier associated with said shared initial filter criteria, a shared initial filter criteria set stored at the first computing device.

8. A system for synchronization of shared initial filter criteria in an IP Multimedia Subsystem (IMS) network, the system comprising:
   a first computing device in the IMS network, the first computing device configured to:
      transmit a server assignment request to a second computing device in the IMS network;
      receive a response to the server assignment request from the second computing device, the response including an identifier stored at the first computing device, said identifier associated with a shared initial filter criteria set of information;

determine whether the shared initial filter criteria set corresponding to the identifier is stored at the first computing device;

transmit, a retrieval request including the identifier to the second computing device if the shared initial filter criteria set corresponding to the identifier is not currently available or not stored at the first computing device;

receive the shared initial filter criteria set corresponding to the identifier from the second computing device in response to the retrieval request;

store the shared initial filter criteria set;

wherein the first computing device is a Serving-Call Session Control Function node and the second computing device is a Home Subscriber Server and said first and said second computing devices communicate using a Sh IMS interface;

wherein said Serving-Call Session Control Function node and said Home Subscriber Server also communicate using a Cx IMS interface; and wherein said Home Subscriber Server is provisioned to include a dummy user profile having a public user identifier and repository data, said dummy public user identifier being the same as said identifier associated with said shared initial filter criteria set, and said repository data including said shared initial filter criteria set.

9. A computer program product, tangibly embodied in a non-transitory computer-readable storage medium, for synchronization of shared initial filter criteria in an IP Multimedia Subsystem (IMS) network, the computer program product including instructions operable to cause a first computing device in the IMS network to:

transmit a server assignment request to a second computing device in the IMS network;

receive a response to the server assignment request from the second computing device, the response including an identifier stored at the first computing device, said identifier associated with a shared initial filter criteria set;

determine whether the shared initial filter criteria set corresponding to the identifier is stored at the first computing device;

transmit a retrieval request including the identifier to the second computing device if the shared initial filter criteria set corresponding to the identifier is not currently available or not stored at the first computing device;

receive the shared initial filter criteria set corresponding to the identifier from the second computing device in response to the retrieval request;

store the shared initial filter criteria set;

wherein the first computing device is a Serving-Call Session Control Function node and the second computing device is a Home Subscriber Server and said first and said second computing devices communicate using a Sh IMS interface;

wherein said Serving-Call Session Control Function node and said Home Subscriber Server also communicate using a Cx IMS interface; and wherein said Home Subscriber Server is provisioned to include a dummy user profile having a public user identifier and repository data, said dummy public user identifier being the same as said identifier associated with said shared initial filter criteria set, and said repository data including said shared initial filter criteria set.

10. A system for synchronization of shared initial filter criteria in an IP Multimedia Subsystem (IMS) network, the system comprising:

means for transmitting, by a first computing device in the IMS network, a server assignment request to a second computing device in the IMS network;

means for receiving, at the first computing device, a response to the server assignment request from the second computing device, the response including an identifier stored at the first computing device, said identifier associated with a shared initial filter criteria set;

means for determining, by the first computing device, whether the shared initial filter criteria set corresponding to the identifier is stored at the first computing device;

means for transmitting, by the first computing device, a retrieval request including the identifier to the second computing device if the shared initial filter criteria set corresponding to the identifier is not currently available or not stored at the first computing device;

means for receiving, at the first computing device, the shared initial filter criteria set corresponding to the identifier from the second computing device in response to the retrieval request;

means for storing, at the first computing device, the shared initial filter criteria set;

wherein the first computing device is a Serving-Call Session Control Function node and the second computing device is a Home Subscriber Server and said first and said second computing devices communicate using a Sh IMS interface;

wherein said Serving-Call Session Control Function node and said Home Subscriber Server also communicate using a Cx IMS interface; and wherein said Home Subscriber Server is provisioned to include a dummy user profile having a public user identifier and repository data, said dummy public user identifier being the same as said identifier associated with said shared initial filter criteria set, and said repository data including said shared initial filter criteria set.

11. The method of claim 4, wherein said update to the shared initial filter criteria set received by said Serving-Call Session Control Function node is received as a Diameter Push Notification Request message including a public user identifier set to said dummy public user identifier.

* * * * *